United States Patent [19]
Hansen

[11] Patent Number: 5,632,100
[45] Date of Patent: May 27, 1997

[54] PROCESS AND A SPRAY DRYING APPARATUS FOR PRODUCING AN AGGLOMERATED POWDER

[75] Inventor: Ove E. Hansen, AllerØd, Denmark

[73] Assignee: Niro Holding A/S, Soborg, Denmark

[21] Appl. No.: 646,310

[22] PCT Filed: Nov. 17, 1993

[86] PCT No.: PCT/DK93/00376

§ 371 Date: May 15, 1996

§ 102(e) Date: May 15, 1996

[87] PCT Pub. No.: WO95/13864

PCT Pub. Date: May 26, 1995

[51] Int. Cl.[6] .................................................. F26B 7/00
[52] U.S. Cl. ........................ 34/374; 34/372; 34/375; 34/377
[58] Field of Search ........................... 34/372, 373, 374, 34/375, 377

[56] References Cited

U.S. PATENT DOCUMENTS

| | | | |
|---|---|---|---|
| 2,292,897 | 8/1942 | Nielsen | 34/375 |
| 3,324,567 | 6/1967 | Franck | 34/22 |
| 3,460,600 | 8/1969 | De Boer | 159/4 |
| 3,748,103 | 7/1973 | Bean et al. | 23/313 AF |
| 4,490,403 | 12/1984 | Pisecky et al. | 426/453 |
| 5,100,509 | 3/1992 | Pisecky et al. | 159/4.2 |
| 5,556,274 | 9/1996 | Ettie et al. | 432/159 |

FOREIGN PATENT DOCUMENTS

| | | |
|---|---|---|
| 0097484 | 1/1984 | European Pat. Off. . |
| WO8912207 | 12/1989 | European Pat. Off. ............ 34/372 |
| 0378498 | 7/1990 | European Pat. Off. . |
| 1026329 | 4/1966 | United Kingdom . |

*Primary Examiner*—Henry A. Bennett
*Assistant Examiner*—Dinnatia Doster
*Attorney, Agent, or Firm*—Sughrue, Mion, Zinn, Macpeak & Seas

[57] ABSTRACT

In a spray drying and agglomerating process carried out in a spray drying chamber (1) having a conical lower section (3), in which chamber the liquid to be spray dried is atomized into a downward central stream of drying gas and the spent drying gas is withdrawn from non-central locations (5, 11) in the upper part of the drying chamber together with entrained fine particles, m the fine particles are recycled to the drying chamber by pneumatic injection thereof from a location in the lower part of the drying chamber and in one or more directions forming an angle of 0°–90° to the upward center axis of the chamber. An apparatus suitable for carrying out the process has the capability of performing the separation and recycling of the fine particles as specified.

24 Claims, 2 Drawing Sheets

PROCESS AND A SPRAY DRYING APPARATUS FOR PRODUCING AN AGGLOMERATED POWDER

FIELD OF THE INVENTION

The present invention relates to a spray drying process and apparatus for the production of an agglomerated powder of solids from a liquid solution and/or dispersion thereof.

BACKGROUND OF THE INVENTION AND PRIOR ART

In the spray drying of products which at certain combinations of temperatures and moisture contents are sticky, various processes and apparatuses are used to obtain the product as an agglomerated powder.

In certain of the spray drying systems used for this purpose the atomization of the liquid to be dried and at least a substantial part of the drying of the atomized liquid take place in a chamber of which the lower part is formed by a conical downward tapering section, and the liquid is atomized into a central downward stream of drying gas, whereas the spent drying gas is recovered together with entrained fine powder particles from non-central locations in the uppermost part of the chamber.

In the present specification the term "central" indicates locations on or near the vertical centeraxis of the chamber, whereas the term "non-central location" means any place between the central one and the periphery of the chamber. The above mentioned recovering of spent drying gas may thus for instance take place through an annular orifice surrounding the central downward stream of drying gas.

The product comprising agglomerated powder particles of suitable size is recovered from the bottom part of the conical section of the drying chamber.

The fine particles entrained with the spent drying gas and often forming a substantial part of the particles produced in the spray drying process are recovered by means of cyclones, bag filters or other conventional dust-separating equipment.

Since said fine particles will often be too small to fulfil the specifications set for the final product they are recycled to the chamber to contact wet droplets or sticky moist particles to form agglomerates of suitable size.

Said recycling are conventionally made to locations in the upper part of the spraying chamber, for instance in adjustable distance from the atomizing device, as disclosed in European patent application No. 378 498, alternatively the fine particles are injected tangentially along the chamber walls in the lower part of the chamber. It has also been suggested to inject the fine particles in an upward direction just below the atomizer device to have the fine particles intersect the part of the droplets ejected from the atomizer device, confer U.S. Pat. Nos. 3,324,567, 3,460,600 and 4,279,873. However, this last mentioned system for recycling of the fine particles has been suggested only in connection with spray driers having a flow pattern substantially different from the one existing in the above described drying chambers in which the drying air is introduced in a central downward stream and leaves the chamber from non-central exits in the top of the chamber.

Among the spray drying processes of special interest in connection with the present invention are those, in which a layer of fluidized particles is maintained in the bottom of the spray drying chamber. Said fluidized layer receives partly dried particles formed by partial drying of droplets atomized in the upper part of the chamber. In the fluidized layer these spray dried particles are agglomerated and further dried either to the final moisture content or to a moisture content above the desired moisture content in the final product, but sufficiently low to enable recovering of the agglomerated powder for subsequent drying, for instance in a vibrated fluidized bed apparatus outside the drying chamber. A process of this type is described for example in European patent specification No. 97 484 and the corresponding U.S. Pat. No. 4,490,403, incorporated herein by reference.

In the prior art systems having a fluidized layer in the bottom of the spray drying chamber, the fine particles separated from the spent drying gas are usually recycled directly to the fluidized layer for further agglomeration therein.

The present invention provides improvements in spray drying and agglomeration processes utilizing the typical flow pattern formed in a spray drying chamber, in which the centrally downward introduced drying air is withdrawn from non-central locations in the top of the spray drying chamber.

Such recovering of the spent drying gas from non-central locations in the top of the drying chamber is mainly, but not solely utilized in connection with systems having a fluidized layer in the bottom of the chamber, for which reason an essential feature of the invention is improvement of such processes and apparatuses utilizing an integrated fluid bed.

It is an object of the invention to improve the product quality of processes of the above described type to obtain desired large agglomerated particles having a low content of dustforming small particles and having a very low degree of heat damage.

An other object is to increase the production capacity and the heat economy of spray drying apparatuses and processes of the above defined type and to facilitate operation thereof.

Further objects and advantages will appear form the below description.

SUMMARY OF THE INVENTION

It has turned out that said objects may be achieved by conducting the recycling of the fine particles to the spray drying chamber in a special way as explained below.

Thus the invention deals with a process for producing an agglomerated powder by spray drying a liquid in a drying chamber of which the lower part is formed by a conical downward tapering section, including the steps of atomizing said liquid in the upper part of the drying chamber into at least one downward first stream of drying gas to produce particles, withdrawing a stream of spent drying gas from at least one-location in the upper part of the drying chamber together with entrained fine powder particles thereby creating a drying gas flow having an outward and upward turning portion in the conical chamber section, collecting said fine powder particles from the thus withdrawn stream of spent drying gas, and recycling them to the drying chamber, and recovering agglomerated powder product of low dust content from the bottom of the chamber.

According to the invention the improvement comprising recycling of said fine particles to the drying chamber by pneumatic injection thereof from a location in the lower part of the drying chamber and in one or more directions forming an angle of 0°–90° to the upward center axis of the chamber, to utilize said outward and upward turning portion of the drying gas flow to introduce the fine particles evenly in a horizontal, annular zone near the wall of the conical section of the chamber.

By performing the recycling of the fine particles as an upward axial and/or slanting outward injection in the lower conical section of the drying chamber, preferably in the lower half of said section, it is ensured that an even and substantial concentration of fines will be present in the chamber at the location where such an even and substantial fines concentration is most advantageous to obtain an efficient agglomeration and an improved drying, permitting better heat economy since a reduction of drying air temperature and a higher relative humidity can be tolerated without operational problems caused by depositing of sticky moist powder on the chamber walls. The efficient agglomeration is reflected in the formation of strong agglomerates and a very low proportion of dust in the final product.

The above beneficial effect of recycling fine particles by injecting them as defined above may be explained by computer simulation using the software "Fluent", obtainable from Fluent Inc., Hannover, N.H., US. By said computer simulating technique it is possible to establish that a maximum concentration of moist but not wet particles having a stickiness suitable for catching fines to form agglomerates of desired strength, exists in the chamber in an annular zone adjacent to the wall of the conical section.

By recycling said fines in a predominantly upward direction from a site above the center of the fluidized layer the fines meet the above-mentioned first stream of drying gas at a location where it is loosing its downward velocity and is diverted outward against the conical chamber wall, as explained in more details below.

By means of this diverted flow of drying gas possibly admixed with gas from an integrated fluidized layer, if present, the fines are carried exactly to the zone near the upper part of the conical chamber wall portion where the concentration of moist particles is high and consequently the chances for agglomerate-forming collision is good.

If, alternatively, the injection of fine particles is made at larger angles to the upward center axis, which means in more horizontal directions, the fine particles are blown more directly to the zone where their effect on the drying and agglomeration is most beneficial.

Said zone near the upper part of the conical chamber wall is the area in the chamber where the risk for formation of sticky deposits on the chamber wall is most pronounced, due to the high particle concentration in said zone. Therefore, it is particularly advantageous that the fines are carried to said zone and distributed evenly therein, since the presence of fine dry particles has a protecting effect against adhering chamber wall deposits.

In comparison with prior art systems in which fine particles are recycled to the upper part of the drying chamber, the present process further has the advantage of avoiding heat damage of the fine particles in the hot zone of the drying chamber.

The present process has been developed mainly in connection with the use of drying apparatuses having an integrated fluidized layer and consequently a preferred embodiment is one, in which a layer of particles is kept fluidized at the bottom of the drying chamber by introduction of a second stream of drying gas through a perforated supporting plate, in which process a pneumatic injection of the fine particles is made from a position between the upper surface of the fluidized layer and halfway up to the top of the chamber.

The atomizing of the liquid to be spray dried is preferably performed by using at least one downward directed nozzle or a rotary atomizer. In the embodiments, where a fluidized layer is maintained in the bottom of the drying chamber most experience exists with nozzle atomization, which is therefore preferred in said embodiments.

In a preferred embodiment the pneumatic injection of the fine particles is accomplished through a vertical pipe debouching in the lower half of the frusto-conical section of the drying chamber.

The upward stream of fine particles then meets the central downward stream of drying gas at a location where it is loosing its downward velocity and is diverted outward against the conical chamber wall to obtain optimal conditions for agglomeration and to protect the chamber walls from contact with moist particles which might cause deposits.

Thereby improved product quality, production capacity and heat economy are obtained as explained in connection with the below descriptions of the embodiments depicted in on the drawing.

Whether the drying chamber is provided with an integral fluidized layer or not, it is often advantageous to recover the agglomerated powder from the bottom of the drying chamber at a moisture content higher than the one desired for the final product and to subject the thus recovered moist powder to a supplementary drying in a fluidized or moving bed outside the drying chamber. Such a drying may be combined with a cooling process and with dust removal by using a drying or cooling air with a velocity such that the fine particles are blown off from the layer of agglomerated particles.

The agglomerated product recovered from the drying chamber may also be subjected to treatment in a gravitational countercurrent classifier to reduce the content of dustforming fine particles therein.

The fine particles separated from the product fraction either in an extraneous fluidized bed or in a gravitational classifier may be recycled to the drying chamber together with the fine particles collected from the stream of drying gas withdrawn at the top of the drying chamber or alternatively they may, to reduce the amount of fine particles to be recycled to the drying chamber, be added to the feed liquid before atomization thereof.

The fact that recycling of the fine particles by the process according to the present invention counteracts formation of harmful deposits on the chamber wall, enables operation of the drying chamber at a higher relative humidity than would have been possible with conventional recycling systems.

Since operation at higher relative humidity enables energy savings a preferred embodiment of the process is characterized in, that the amount, temperature and concentration of the liquid which is atomized as well as the amount and temperature of drying gas are adjusted to obtained a relative humidity of the stream of spent drying gas withdrawn from the chamber substantially higher than the maximum relative humidity allowable if fine particles were recycled using the conventional procedures therefore.

As mentioned above, the preferred means for reintroducing the fine particles in the drying chamber is an upward directed pipe debouching under the location where the downward stream of drying gas is loosing its downward velocity. A convenient mode for establishing where this happens is by means of computer simulation.

Alternatively, the introduction of the particles to be recycled can take place by means which direct the fine particles more directly towards the chamber walls, which means may be stationary or mobile, for instance rotatable utilizing the energy of the pressurized gas serving as transportation gas for the fine particles to rotate a nozzle-like member.

The invention further comprises a spray drying apparatus suitable for producing an agglomerated powder by the process according to the invention, said apparatus having a drying chamber, the lower part of which is formed by a conical downward tapering section, means for atomizing a liquid into an atomizing zone in the upper part of the chamber, drying gas distributing means for directing at least one first stream of drying gas downward around the atomizing means, means for withdrawing an agglomerated powder from the bottom of the chamber, outlet means in the top of the chamber for withdrawing a stream of spent drying gas and entrained fine particles, and means for collecting said fine particles and reintroduction thereof into the drying chamber, characterized in that said means for reintroducing said fine particles into the chamber comprises means for pneumatic injection of the fine particles in the lower part of the drying chamber and in one or more directions forming an angle of 0°–90° C. to the upward center axis of the chamber to introduce said fine particles evenly in a horizontal annular zone near the wall of the conical section of the chamber by utilizing an outward and upward drying gas flow existing in the lower part of the drying chamber during the operation of the apparatus.

A preferred embodiment of said apparatus comprises means for maintaining a fluidized particle layer at the bottom of the chamber including a perforated plate for supporting said layer and means for introducing a second stream of drying gas below said perforated plate and means for recycling fine particles debouching above the level of the surface of the fluidized layer during operation but at smaller distance to said level than to the top of the chamber.

The process and the apparatus according to the invention may be utilized for producing a large variety of agglomerated powders including technical products, such as dyestuffs and products of the food industry, such as soup powders, milk products, etc.

BRIEF DESCRIPTION OF THE DRAWING

The invention is further explained below with reference to the drawing in which.

DESCRIPTION OF PREFERRED EMBODIMENTS

Figure 1:
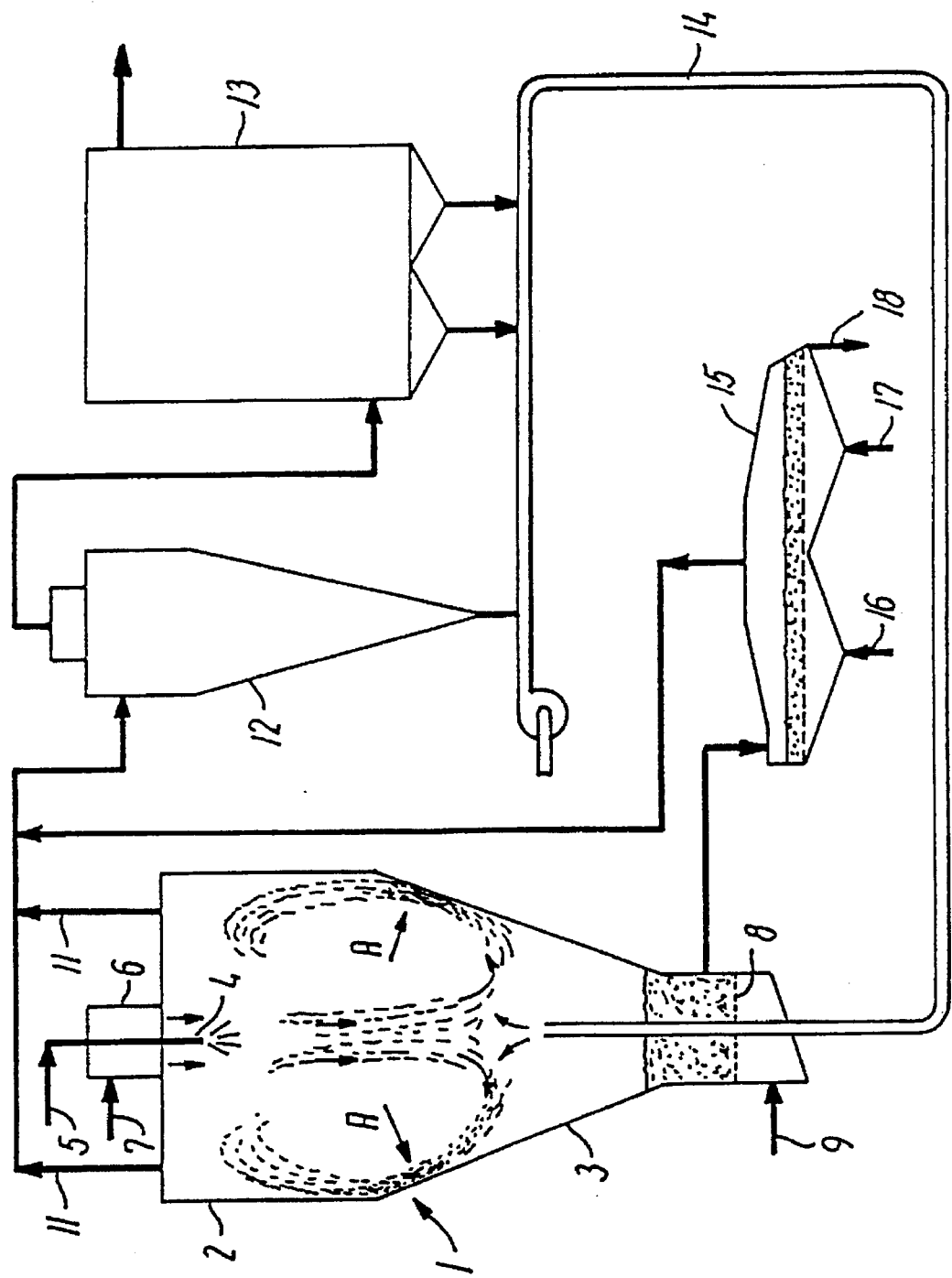
FIG. 1 very schematically depicts an embodiment of a plant suitable for performing the invention, said embodiment comprising an integrated fluidized particle layer at the bottom of the spray drying chamber.

In FIG. 1 of the drawing a spray drying chamber 1 is shown having an upper cylindrical section 2 and an underlaying section 3 of frusto-conical shape.

At the top of the chamber an atomizer 4, in the depicted embodiment a nozzle, is arranged for atomizing a liquid feed supplied through conduit 5. In the ceiling the chamber also has a gas distributor 6 receiving hot drying gas through conduit 7.

From the gas distributor 6 a first stream of drying gas, typically drying air, is directed downwards around the atomizer 4, and the droplets ejected therefrom are by said first stream of drying gas carried downwards centrally in the chamber as shown on the drawing, and at the same time an evaporation takes place from the droplets which are thereby converted into moist solid particles.

At the bottom portion of the drying chamber a perforated supporting plate 8, is arranged, below which a secondary stream of drying gas is introduced through conduit 9. Above said plate 8 a fluidized layer 10 is maintained consisting of particles formed in the upper part of the chamber by partial drying of the atomized droplets.

The secondary stream of drying gas introduced through 9 passes the perforated plate 8 and the fluidized layer 10, from where it leaves to the drying chamber entraining the fine, non-agglomerated particles from said fluidized layer.

A stream of gas comprising the gas introduced through 7 and 9 as well as vapours formed by the drying, and auxiliary gas are together with a substantial amount of entrained fine particles withdrawn from the ceiling of the chamber through ducts 11 and conducted to a cyclone 12. From said cyclone the gas is conducted with a reduced particle content through a baghouse filter 13 for collecting nearly all the remaining particles in the gas stream.

The particles recovered in the cyclone 12 and in the baghouse filter 13 are, according to the invention, pneumatically recycled to the drying chamber 1 through a pipe 14 which debouches above a fluidized layer at a central site in the frusto-conical section 3 of the drying chamber, preferably in the lower half part of said section.

From the fluidized layer 10 a product is continuously withdrawn to an external after-drying unit 15, preferably a vibrated fluidized bed apparatus, wherein a further drying and cooling are performed. The depicted embodiment receives drying gas in a first section through conduit 16 and cooling gas through conduit 17.

The spent drying and cooling gas which leaves the unit 15 contains a minor amount of entrained fine dustforming particles and are therefore let to the cyclone as shown.

Alternatively, the fine particles entrained by the gas leaving the unit 15 may be recovered from said gas by a separate cyclone, filter or wet scrubber and used for preparing the liquid to be introduced through conduit 5. This alternative arrangement is not shown on FIG. 1.

The final product consisting essentially of relatively large, strong agglomerates having the desired particle size and which has only a very small content of dustforming particles is recovered from unit 15 through conduit 18.

As schematically indicated on the drawing, the downward flow of the first stream of drying gas in the chamber 1 is diverted towards the chamber walls at a certain level of the frusto-conical section 3 of the chamber. This is partly a result of the influence of the upward flow (not shown on the drawing) of the second stream of drying gas passing through the fluidized layer but this characteristic flow pattern also exists in spray drying chambers operating without secondary drying gas being introduced in the bottom, as long as the introduction and withdrawal of the primary drying gas are as specified above.

The fine particles recycled to the chamber via the pipe 14 meets the first stream of drying gas with entrained moist particles at the place where said first stream diverts or turns direction towards the conical chamber walls. By this diverted or deflected gas stream the fine particles are carried to an annular zone very near the conical walls and, dependent on the general shape of the chamber in the vicinity of the level where the upper part of the conical wall meets the cylindrical wall. On the drawing said zone is indicated by arrows marked A.

In contrast to what has hitherto been assumed, the zone A is the place where the concentration of particles having a uniform moisture content and a suitable stickiness for forming agglomerates with the fine particles, is higher than in most other parts of the drying chamber above the fluidized layer.

A substantial part of the moist powder produced by the drying of the atomized droplets and entrained with the stream of drying gas collects on the conical chamber walls in admixture with the recycled fine particles. Due to the features characteristic for the invention these particles are carried just to the zone where said moist powder collects, and the presence of these relatively dry fine particles makes it possible for said powder to collect in a quite moist state without adhering to the chamber walls.

The thus formed mixture of relatively dry recycled fine particles and moist particles resulting from only partially dried atomized droplets slides down into the fluidized bed wherein it is further dried, and solid agglomerates of particles having fixed positions in relation to each other are formed.

For several reasons, including heat economical considerations well known to the skilled person, it is desired in drying processes of the present type to perform as large a portion of the drying as possible in the fluidized bed layer.

The present process enables fulfilment of this desire to a higher extent than do comparable prior art processes.

As an alternative to the embodiment shown in FIG. 1 having a fluidized layer at the bottom of the drying chamber, the apparatus may operate without such a fluidized layer and in this case the product is recovered from the lowest part of the conical section which is typically provided with a rotary lock valve. In this embodiment which is not shown on the drawing the pipe for recycling the fine particles may pass through the conical wall of the drying chamber and bend upwards to deliver the fine particles as specified in the above description of the present invention.

Figure 2:
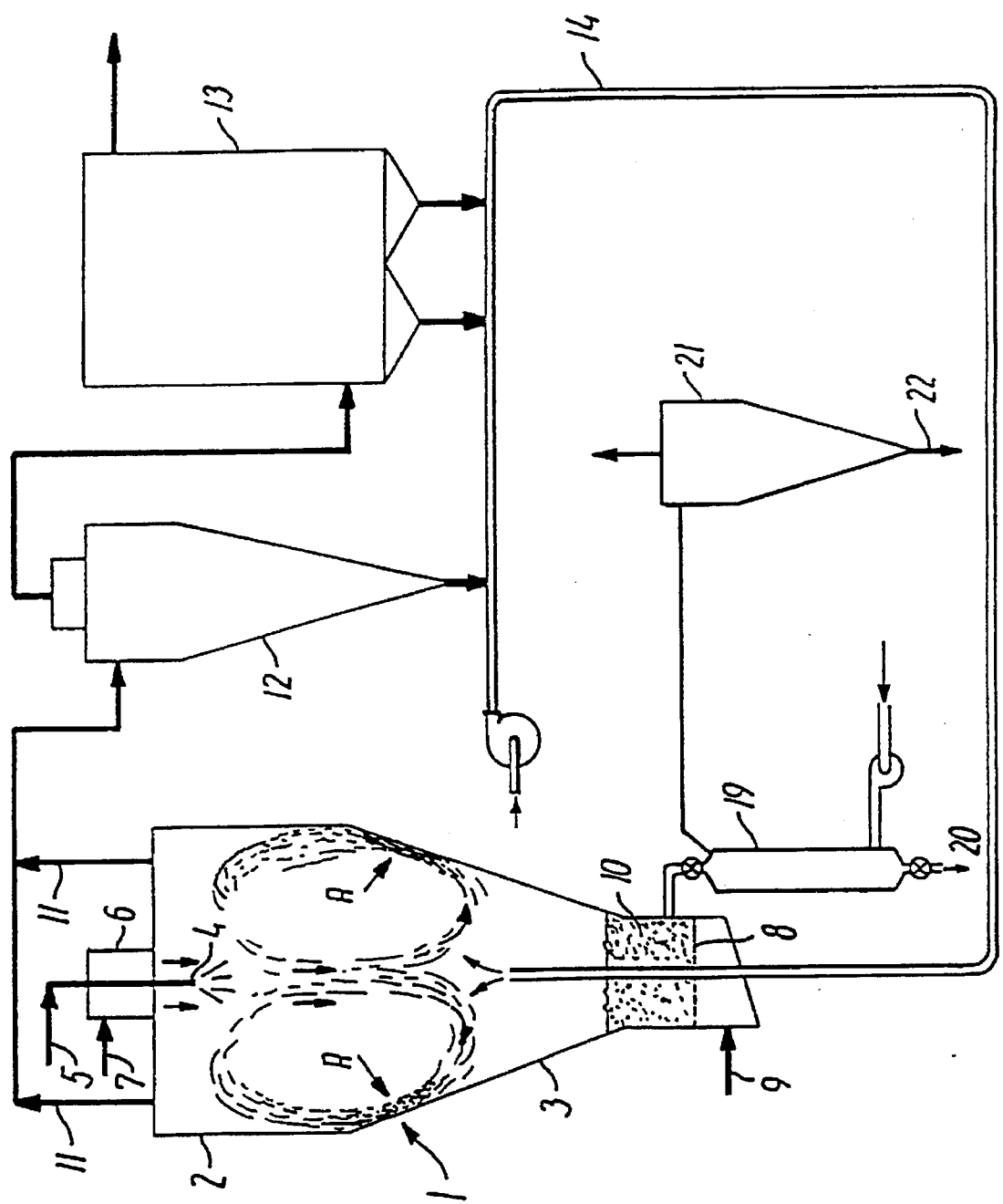
FIG. 2 depicts an embodiment similar to the one shown in FIG. 1 but having a different system for aftertreatment of the produced agglomerates and utilization of the fine particles separated therefrom.

On the drawing FIG. 2 depicts an alternative version of the process in which the agglomerates recovered from the fluidized layer 10 pass through a horizontal countercurrent classifier 19. Through the passage the agglomerate product is cooled and substantially freed from dustforming fine particles and is recovered through 20, whereas the fine particles entrained by the cooling gas is conducted to a cyclone 21 from where the fine particles are withdrawn through conduit 22 and let to a (not shown) plant for manufacturing the feed liquid to be introduced to the atomizer through conduit 5. Alternatively the fine particles withdrawn through 22 or a part thereof may be recycled to the chamber 1 together with the fine particles recovered in 12 and 13.

From the explanation presented with reference to FIG. 1 above it will be understood that introduction of the fine particles as specified involves considerable advantages over prior art processes where recycling is made either to the upper part of the drying chamber near the atomizer or in the bottom of the chamber into the fluidized bed or tangentially. Said advantages will be further substantiated in the Examples below.

The invention will be further explained with reference to the following example.

EXAMPLE

A series of tests was conducted in a plant essentially corresponding to the one depicted in FIG. 1.

The spray drying chamber had a diameter of 2.0 meter, a cylindrical hight of 2.3 meter and a cone angle of 40°.

Besides the arrangement for reintroduction of the fine particles according to the present invention as shown in FIG. 1, the spray drying chamber was equipped with means for injecting the fine particles near the atomizer nozzle 4 or tangentially to the upper part of the conical chamber walls as conventional.

Further the chamber was equipped with pneumatic hammers to counteract depositing of moist powder on the chamber walls.

The product from the integrated fluidized layer was passed through two 0.3 m² vibrated fluid beds acting as coolers before bagging off.

In all tests the feed to be spray dried was an aqueous solution of maltodextrine of 38 percent by weight dry solids prepared by dissolving maltodextrine in demineralized water and keeping the solution overnight without stirring for release of air bubbles.

A total of 10 tests were made. Tests 1–5 were made with recycling of the fine particles to the nozzle or to the cone walls and thus represent the conventional prior art technique.

Tests 6–10 were run according to the present invention and the fine particles were injected pneumatically upward from a pipe debouching 2 m above plate (tests 6 and 7) or 0.75 m above plate (tests 8–10).

The most important of the operational parameters and characteristics of the product obtained appear from the following table:

| Test No. | Locations for fines injection | Feed rate kg/h | Primary drying air | | Drying air to integrated fluidized layer | | Mixed spent drying air | | Product from integrated fluidized layer | | |
|---|---|---|---|---|---|---|---|---|---|---|---|
| | | | rate kg/h | Temp. °C. | kg/h | Temp. °C. | Temp. °C. | Rel. hum. % | moisture % | D[v, 0.5] μm | Span |
| 1 | nozzle | 95 | 1440 | 227 | 578 | 80 | 93 | 8.6 | — | | |
| 2 | cone walls | 95 | 1424 | 198 | 578 | 81 | 80 | 14.1 | 2.54 | 152 | 1.11 |
| 3 | nozzle | 97 | 1440 | 198 | 578 | 81 | 77 | 15.8 | 3.37 | 170 | 1.51 |
| 4 | cone walls | 97 | 1440 | 200 | 578 | 80 | 79 | 14.8 | 3.04 | 178 | 5.39 |
| 5 | nozzle (modified)[1] | 98 | 1440 | 199 | 589 | 81 | 81 | 13.4 | 4.53 | 180 | 3.71 |
| 6 | 2 m above plate | 98 | 1450 | 201 | 585 | 77 | 81 | 13.3 | 2.85 | 151 | 1.14 |
| 7 | 2 m above plate | 99 | 1450 | 182 | 484 | 76 | 70 | 21.4 | 5 | 157 | 1.10 |

-continued

| Test No. | Locations for fines injection | Feed rate kg/h | Primary drying air rate kg/h | Primary drying air Temp. °C | Drying air to integrated fluidized layer kg/h | Drying air to integrated fluidized layer Temp. °C | Mixed spent drying air Temp. °C | Mixed spent drying air Rel. hum. % | Product from integrated fluidized layer moisture % | Product from integrated fluidized layer D[v, 0.5] μm | Product from integrated fluidized layer Span |
|---|---|---|---|---|---|---|---|---|---|---|---|
| 8 | 0.75 m above plate | 101 | 1460 | 179 | 481 | 77 | 69 | 23.5 | — | — | — |
| 9 | 0.75 m above plate | 98 | 1450 | 170 | 479 | 76 | 64 | 27.8 | 6.33 | 173 | 1.08 |
| 10 | 0.75 m above plate | 98 | 1453 | 159 | 483 | 77 | 62 | 30.3 | 7.82 | 186 | 1.07 |

[1] via a cyclone around the nozzle

To supplement the information deducible from the table, the following remarks should be made to the tests:

Test 1

The product comprised a fraction of very large agglomerates which were over-wetted.

Test 2

Very small loose deposits in the cone tip of the chamber. Not critical but the plant was on the limit for steady state running.

Test 3

As in test 1 agglomerates which had been over-wetted or were still to wet were present, deposits as in test 2.

Test 4

Deposits as in test 2.

Test 5

In this test where the fines were recycled via a cyclone around the nozzle over-wetted and wet agglomerates as well as deposits were found as in test 2.

Tests 6–10

In these tests, which represent the process according to the invention, the recycling is performed through a 50 mm vertical pipe located as specified in the table.

While maintaining the feed rate between 98 and 101 kg/h it was found possible to reduce the inlet temperature to 159° C. and the outlet temperature to 62° C., as it appears from the table, at steady state conditions and without critical deposits. At the same time the relative humidity of the mixed spent drying air was increased to 30.3%. There were no over-wetted or wet agglomerates in the product.

The fact that the process can be operated with such a high relative humidity in the mixed drying air leaving the drying chamber reflects the efficiency of the process and the improved heat economy obtainable therewith.

The D[v,0.5] μm values of the table show that the particle size of the product agglomerates is in the desired range, and the Span values show that the agglomerate size distribution is excellent for the product of the tests 6–10.

I claim:

1. A process for producing an agglomerated powder by spray drying a liquid in a drying chamber of which the lower part is formed by a conical downward tapering section, including the steps of atomizing said liquid in the upper part of the chamber into at least one downward first stream of drying gas to produce particles, withdrawing a stream of spent drying gas from at least one non-central location in the upper part of the drying chamber together with entrained fine powder particles, thereby creating a drying gas flow having an outward and upward turning portion in the conical chamber section, collecting said fine powder particles from the thus withdrawn stream of spent drying gas, and recycling them to the drying chamber, and recovering an agglomerated powder product from the bottom of the chamber, characterized in that the recycling of said fine particles to the drying chamber is performed by pneumatic injection thereof from a location in the lower part of the drying chamber and in one or more directions forming an angle of 0°–90° to the upward center axis of the chamber, to utilize said outward and upward turning portion of the drying gas flow to introduce the fine particles evenly in a horizontal, annular zone near the wall of the conical section of the chamber.

2. The process of claim 1 in which a layer of particles is kept fluidized at the bottom of the drying chamber by introduction of a second stream of drying gas through a perforated supporting plate, characterized in that the pneumatic injection of the fine particles is made from a position between the upper surface of the fluidized layer and halfway up to the top of the chamber.

3. The process of claim 1, wherein the atomizing of the liquid is performed by using at least one downward directed nozzle or a rotary atomizer.

4. The process of claim 1, wherein the pneumatic injection of the fine particles is accomplished through a vertical pipe debouching in the lower half of the conical section of the drying chamber.

5. The process of claim 1, wherein the agglomerated powder recovered from the bottom of the drying chamber is subjected to a drying and/or cooling in a fluidized or moving bed.

6. The process of claim 1, wherein the agglomerated powder recovered from the drying chamber is subjected to a treatment in a gravitational countercurrent classifier to reduce the content of dustforming fine particles therein.

7. The process of claim 1, wherein the amount, temperature and concentration of said liquid atomized as well as the amount and temperature of drying gas are adjusted to obtain a relative humidity of the stream of spent drying gas withdrawn from the chamber substantially higher than the maximum relative humidity allowable if fine particles were recycled using the conventional procedures therefor.

8. The process of claim 1, wherein the place for introduction of recycled fine particles into the drying chamber is below the level where the central part of the downward first stream of drying gas has substantially lost its downward velocity and is turning outward.

9. The process of claim 8, wherein said level where the central part of the downward first stream of drying gas has substantially lost its downward velocity is estimated by using computer simulation.

10. A spray drying apparatus having a drying chamber (1), the lower part of which is formed by a conical downward tapering section (3), means (4) for atomizing a liquid into an atomizing zone in the upper part of the chamber, drying gas distributing means (6) for directing at least one first stream of drying gas downward around the atomizing means, means for withdrawing an agglomerated powder from the bottom of the chamber, outlet means (11) in the top of the chamber for withdrawing a stream of spent drying gas and entrained fine particles, and means for collecting said fine particles (12,13) and reintroduction thereof into the drying chamber, characterized in that said means for reintroducing said fine particles into the chamber comprises means (14) for pneumatic injection of the fine particles in the lower part of the drying chamber and in one or more directions forming an angle of 0°–90° C. to the upward center axis of the chamber (1) to introduce said fine particles evenly in a horizontal annular zone (A) near the wall of the conical section (3) of the chamber by utilizing an outward and upward drying gas flow existing in the lower part of the drying chamber during the operation of the apparatus.

11. An apparatus according to claim 10 comprising means for maintaining a fluidized particle layer (10) at the bottom of the chamber (1) including a perforated plate (8) for supporting said layer and means (9) for introducing a second stream of drying gas below said perforated plate, and means for recycling said fine particles debouching above the level of the surface of the fluidized layer during operation but at smaller distance to said level than to the top of the chamber.

12. An apparatus according to claim 10, wherein said means for recycling the fine particles to the drying chamber comprises a central upward directed pipe debouching in the lower half of the conical section of the chamber.

13. An apparatus according to claim 10, wherein the means for atomizing the liquid is selected between a two-fluid nozzle, a pressurized nozzle and a rotary atomizer.

14. An apparatus according to claim 10 having a vertical gravitational classifier which is connected to said means for withdrawing powder from the bottom of the spray drying chamber, the upper end of said classifier being connected to a particle separator (21) for recovering fine particles, and the bottom portion of said classifier having an outlet for product agglomerate particles and an inlet for classifying gas.

15. An apparatus according to claim 14, wherein the particle separator is connected to means for conducting the particles recovered therein to the feed liquid to be atomized and/or to the chamber (1) together with the fine particles recovered in the collecting means (12,13).

16. The process of claim 2, wherein the atomizing of the liquid is performed by using at least one downward directed nozzle or a rotary atomizer.

17. The process of claim 2, wherein the pneumatic injection of the fine particles is accomplished through a vertical pipe debouching in the lower half of the conical section of the drying chamber.

18. The process of claim 3, wherein the pneumatic injection of the fine particles is accomplished through a vertical pipe debouching in the lower half of the conical section of the drying chamber.

19. An apparatus according to claim 11, wherein said means for recycling the fine particles to the drying chamber comprises a central upward directed pipe debouching in the lower half of the conical section of the chamber.

20. An apparatus according to claim 11, wherein the means for atomizing the liquid is selected between a two-fluid nozzle, a pressurized nozzle and a rotary atomizer.

21. An apparatus according to claim 12, wherein the means for atomizing the liquid is selected between a two-fluid nozzle, a pressurized nozzle and a rotary atomizer.

22. An apparatus according to claim 11, having a vertical gravitational classifier which is connected to said means for withdrawing powder from the bottom of the spray drying chamber, the upper end of said classifier being connected to a particle separator (21) for recovering fine particles, and the bottom portion of said classifier having an outlet for product agglomerate particles and an inlet for classifying gas.

23. An apparatus according to claim 12, having a vertical gravitational classifier which is connected to said means for withdrawing powder from the bottom of the spray drying chamber, the upper end of said classifier being connected to a particle separator (21) for recovering fine particles, and the bottom portion of said classifier having an outlet for product agglomerate particles and an inlet for classifying gas.

24. An apparatus according to claim 13, having a vertical gravitational classifier which is connected to said means for withdrawing powder from the bottom of the spray drying chamber, the upper end of said classifier being connected to a particle separator (21) for recovering fine particles, and the bottom portion of said classifier having an outlet for product agglomerate particles and an inlet for classifying gas.

\* \* \* \* \*